US011858334B2

(12) United States Patent
Ohlhoff et al.

(10) Patent No.: US 11,858,334 B2
(45) Date of Patent: Jan. 2, 2024

(54) MOUNTING ARRANGEMENT FOR A HEAT EXCHANGER

(71) Applicant: VOLKSWAGEN AKTIENGESELLSCHAFT, Wolfsburg (DE)

(72) Inventors: Jörg Ohlhoff, Wolfsburg (DE); Robert Stelzner, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 710 days.

(21) Appl. No.: 16/584,231

(22) Filed: Sep. 26, 2019

(65) Prior Publication Data
US 2020/0101817 A1    Apr. 2, 2020

(30) Foreign Application Priority Data

Oct. 2, 2018   (DE) ...................... 10 2018 124 295.6

(51) Int. Cl.
*B60K 11/04*      (2006.01)
*B60R 19/52*      (2006.01)
(Continued)

(52) U.S. Cl.
CPC .............. *B60K 11/04* (2013.01); *B60R 19/52* (2013.01); *F28F 19/002* (2013.01); *B60H 1/00507* (2013.01); *B60R 2019/527* (2013.01)

(58) Field of Classification Search
CPC ......... B60K 11/04; B60K 11/08; B60R 19/52; B60R 2019/527; B60R 2019/525; B60H 1/00507
See application file for complete search history.

(56) References Cited

U.S. PATENT DOCUMENTS 1,981,424 A * 11/1934 Lake .................. B60H 1/00464
                                              165/41
3,692,004 A *  9/1972 Tangue ...................... F01P 5/06
                                             165/122
(Continued)

FOREIGN PATENT DOCUMENTS

CN       101722833 A      6/2010
CN       201835905 U      5/2011
(Continued)

OTHER PUBLICATIONS

Search Report for European Patent Application No. 19 19 9753, dated Feb. 24, 2020.
(Continued)

*Primary Examiner* — Frank B Vanaman
(74) *Attorney, Agent, or Firm* — PEARL COHEN ZEDEK LATZER BARATZ LLP

(57) ABSTRACT

A mounting arrangement for a motor vehicle, at least having at least one heat exchanger and a protective element for the at least one heat exchanger, which with a grid structure through which a fluid may flow at least partially covers a surface, over which the fluid may flow, of the at least one heat exchanger, wherein the protective element is a component that is manufactured by an injection molding process, and has at least one sealing element, integrally formed on the protective element in a multicomponent method, for conducting flow of the fluid.

14 Claims, 4 Drawing Sheets

(51) Int. Cl.
  *F28F 19/00* (2006.01)
  *B60H 1/00* (2006.01)

(56) References Cited

U.S. PATENT DOCUMENTS

| | | | | |
|---|---|---|---|---|
| 3,827,523 | A * | 8/1974 | Williams | F01P 5/08 |
| | | | | 165/44 |
| 3,834,478 | A * | 9/1974 | Alexander | B60K 11/04 |
| | | | | 165/77 |
| 3,933,136 | A * | 1/1976 | Burst | E02F 3/968 |
| | | | | 123/41.58 |
| 4,169,501 | A * | 10/1979 | Takeuchi | B60K 11/04 |
| | | | | 165/126 |
| 5,193,636 | A * | 3/1993 | Holm | F02B 77/13 |
| | | | | 180/69.21 |
| 5,853,046 | A | 12/1998 | Williams et al. | |
| 6,000,460 | A * | 12/1999 | Yamanaka | F28D 1/0435 |
| | | | | 165/81 |
| 6,189,492 | B1 * | 2/2001 | Brown | B60S 1/50 |
| | | | | 123/41.49 |
| 6,298,906 | B1 * | 10/2001 | Vize | F28F 9/002 |
| | | | | 165/41 |
| 8,708,345 | B2 | 4/2014 | Leonard | |
| 2002/0070003 | A1 | 6/2002 | Lenz et al. | |
| 2009/0266523 | A1 | 10/2009 | Sauer et al. | |
| 2011/0132677 | A1 * | 6/2011 | Kawahira | F01P 11/10 |
| | | | | 180/68.1 |
| 2012/0193156 | A1 * | 8/2012 | Hirano | B60K 11/08 |
| | | | | 180/68.1 |
| 2014/0132033 | A1 | 5/2014 | Townson et al. | |
| 2018/0120040 | A1 | 5/2018 | Bireaud et al. | |
| 2020/0101817 | A1 * | 4/2020 | Ohlhoff | B60K 11/08 |

FOREIGN PATENT DOCUMENTS

| | | |
|---|---|---|
| CN | 102092422 A | 6/2011 |
| CN | 104080693 A | 10/2014 |
| DE | 195 08 112 A1 | 9/1996 |
| DE | 196 47 165 A1 | 5/1998 |
| DE | 102 42 468 A1 | 3/2004 |
| DE | 10 2009 021 362 A1 | 11/2010 |
| DE | 101 31 321 B4 | 1/2013 |
| DE | 10 2016 116 289 A1 | 8/2017 |
| ER | 1 974 973 A1 | 10/2008 |
| FR | 2 961 132 A1 | 12/2011 |
| FR | 3 057 945 A1 | 4/2014 |
| FR | 3 035 956 A1 | 11/2016 |

OTHER PUBLICATIONS

Office Action for Chinese Application No. 201910949189.1, dated Jul. 27, 2022.

Search Report for German Patent Application 10 2018 124 295.6, dated Sep. 19, 2019.

* cited by examiner ized. The features individually set forth in the claims may be combined with one another in a technologi-
MOUNTING ARRANGEMENT FOR A HEAT EXCHANGER

CROSS-REFERENCE TO RELATED APPLICATIONS

This application claims priority from German Patent Application No. 10 2018 124 295.6, filed Oct. 2, 2018, which is hereby incorporated by reference in its entirety.

FIELD OF THE INVENTION

The invention relates to a mounting arrangement for at least one heat exchanger for a motor vehicle.

BACKGROUND OF THE INVENTION

For conducting a heat exchanger fluid, a heat exchanger may include a first header box and a second header box, and also at least a plurality of pipes, each extending from the first header box toward the second header box. The pipes may be situated spaced apart from one another, between the first and second header boxes, in such a way that they have a surface over which a fluid (ambient air, for example) may flow along a longitudinal axis of the motor vehicle. Heat exchange takes place between the heat exchanger fluid, conducted through the pipes, and the fluid that flows across the pipes along an axial direction. In particular, the heat exchanger in conjunction with a fan guard is situated in the front end of a motor vehicle, it being common to install the heat exchanger in front of a drive unit of the motor vehicle and in front of the fan guard in the travel direction.

In these types of mounting arrangements, gaps between the individual components, for example the heat exchanger and the fan guard, should be sealed off from the surroundings, so that predefined flow paths of the ambient air, for example (when the motor vehicle is traveling), are maintained, and the efficiency of the heat exchanger is thus maximizable.

Cooling systems are becoming more complex due to the increasing technical demands, while at the same time, predefined states must be achieved in a more precise manner (the sealing design, for example).

Protective grids are known from DE 101 31 321 B4, FR 3 035 956 A1, and US 2018/0120040 A1, which are situated in front of the heat exchanger with respect to the travel direction of the motor vehicle. The protective grids are intended to prevent damage to the heat exchanger, for example from road stones.

The object of the present invention is to at least partially solve the problems stated with regard to the prior art. In particular, the aim is to keep the level of complexity of a mounting arrangement low, and preferably also to meet the increasing demands with regard to sealing and cooling power.

SUMMARY OF THE INVENTION

These objects are achieved by a mounting arrangement having the features according to the independent claims. Advantageous refinements are the subject matter of the dependent claims. The features individually set forth in the claims may be combined with one another in a technologically meaningful manner, and may be supplemented by the explanatory material from the description and/or details from the figures, which indicate further embodiment variants of the invention.

A mounting arrangement for a motor vehicle is proposed, at least having at least one heat exchanger (see the above statements concerning heat exchangers; the heat exchanger is in particular an air intercooler or a condenser), and a protective element for the at least one heat exchanger, which with a grid structure through which a fluid may flow at least partially covers a surface, over which the fluid may flow, of the at least one heat exchanger. The protective element is a component that is manufactured by an injection molding process (injection-molded component), and has at least one sealing element, integrally formed on the protective element in a multicomponent method, for conducting flow of the fluid.

The motor vehicle has a longitudinal axis (extending transversely with respect to the wheel axles), a transverse axis (extending transversely with respect to the longitudinal axis), and a yaw axis (transverse to the longitudinal axis and transverse axis, generally parallel to the force of gravity). In the following discussion, it is assumed that the at least one heat exchanger is situated in the motor vehicle essentially in a plane spanned by the transverse axis and the yaw axis. In addition, it is assumed that a fluid flows through the heat exchanger along an axial direction (due to the motion of the motor vehicle in the travel direction, ambient air flows essentially along the longitudinal axis). Therefore, the axial direction used in the following discussion is essentially parallel to the longitudinal axis. The radial direction and the circumferential direction used in the following discussion in each case extend transversely with respect to the axial direction, and thus essentially transversely with respect to the longitudinal axis. The term "axis" and the indicated directions are also used below for the mounting arrangement, assuming the mentioned orientation of the mounting arrangement or of the at least one heat exchanger. If the mounting arrangement or the at least one heat exchanger is oriented differently in the motor vehicle, correspondingly differently oriented axes or directions then apply for the following statements.

The mounting arrangement is situated in particular in a front area (with respect to the customary travel direction) of the motor vehicle (in the so-called front end). The mounting arrangement is in particular installed in front of a drive unit of the motor vehicle in the travel direction.

The mounting arrangement may be connected to the motor vehicle via one of the components of the mounting arrangement described below, and/or via a separate mounting support.

Injection molding is a shaping process used in plastic processing, for example. The material in question is liquefied (plasticized) with an injection molding machine, and injected under pressure into a mold, the injection mold. In the mold, the material goes into the solid state via cooling or a crosslinking reaction, and may be removed after the mold is opened. The hollow space, the cavity, of the mold determines the shape and the surface structure of the finished part. Within the scope of the injection molding process, a multicomponent method may also be carried out. In the method, several different materials (components) are supplied to the mold, so that different areas of a workpiece may be made of respectively different materials, although the workpiece as a whole is manufacturable in one piece. The result is a multicomponent injection-molded component, wherein the two components are present physically separate from one another and are directly joined together, in one part or one piece, and/or are not nondestructively separable from one another.

The grid structure extends in particular at least over a lower portion of the heat exchanger with respect to the force of gravity. In particular, the grid structure extends over a majority of or over the entire width (transverse to the longitudinal axis) of the heat exchanger. In particular, the grid structure should on the one hand protect the heat exchanger or the pipes of the heat exchanger from mechanical stress, for example from road stones. On the other hand, the grid structure should have the lowest possible flow resistance with respect to the fluid. In particular, the grid structure extends over at least 30%, preferably over at least 50%, of the surface area of the pipes of the heat exchanger pointing in the travel direction.

In the present case, it is proposed in particular to manufacture the protective element using a two-component method, wherein the at least one sealing element is made of a first material, and at least the grid structure is made of a different, second material.

In particular, it is possible for the grid structure to be manufactured from a material that is provided for the intended purpose, i.e., in particular having sufficient resistance to road stones and low elastic deformability. In contrast, in particular the at least one sealing element has a lower density and/or a smaller wall thickness (less demands on the strength, and therefore an advantageous more lightweight design) and/or greater elastic deformability (better deformation and thus more flexible adaptation to contact surfaces of adjacent components for forming a seal of a flow path of the fluid with respect to the surroundings of the mounting arrangement).

In particular, the at least one sealing element of the protective element has a lower modulus of elasticity than at least the grid structure of the protective element. For linear elastic behavior, the modulus of elasticity describes the proportional relationship between tension and elongation during the deformation of a solid body.

In particular the protective element, in particular at least the grid structure and/or the at least one sealing element, are/is at least partially manufactured from one or more different plastics (polymers, optionally fiber-reinforced). In particular, the grid structure is (at least partially) made of known PA66-GF30, a polyamide. In particular, the at least one sealing element is made of known TPV-(EPDM and PP) or from known TPS-SBS.

The protective element preferably has a frame part between the at least one sealing element and the grid structure. In particular, the grid structure and the at least one sealing element are joined together in one piece via the frame part.

In particular, the protective element and the at least one heat exchanger are (directly) connected to one another at least via at least one first mounting situated on the frame part. In particular, the first mounting comprises a clip connection, a screw connection, a clamp connection, a rivet connection, an adhesive connection, or the like.

In particular, the protective element and the at least one heat exchanger are aligned with one another via at least one centering device, for example a centering pin.

In particular, the frame part and the grid structure are made of the same material.

In particular, the frame part forms a frame having a design that is closed all around in a circumferential direction.

The at least one sealing element preferably extends at least partially along the frame part, closed all around, along the circumferential direction. In particular, the at least one sealing element may have openings or slots, so that a desired pattern may be ensured in corner areas of the protective element without undesirable deformation of the sealing element.

Alternatively or additionally, a plurality of sealing elements may be provided which are spaced apart from one another on the frame part along the circumferential direction.

In particular, the at least one sealing element, starting from the frame part, extends outwardly at least in a radial direction.

Alternatively or additionally, the at least one sealing element, starting from the frame part, may extend inwardly at least in a radial direction.

In addition, the sealing element may extend, additionally or exclusively, at least partially along the axial direction.

In particular, the mounting arrangement additionally has at least one seal carrier and a fan guard, wherein the seal carrier seals off with respect to the surroundings a flow path for the fluid, extending along an axial direction, between the heat exchanger and the fan guard.

A fan guard is used to accommodate at least one fan wheel via which a fluid flow may be forced through the heat exchanger, in particular also when the motor vehicle is at a standstill.

In particular, the aim is to seal off a flow path of a fluid with respect to the surroundings of the mounting arrangement in the most effective manner possible, so that a fluid can flow only across the heat exchanger and through the fan of the fan guard.

In particular, the seal carrier is connected to the protective element via at least one second mounting. In particular, the second mounting comprises a clip connection, a screw connection, a clamp connection, a rivet connection, an adhesive connection, or the like.

In particular, the seal carrier and the at least one heat exchanger are aligned with one another via at least one centering device, for example a centering pin.

In particular, the seal carrier is connected to the at least one heat exchanger via at least one third mounting. In particular, the third mounting comprises a clip connection, a screw connection, a clamp connection, a rivet connection, an adhesive connection, or the like.

In particular, the seal carrier and the protective element are aligned with one another via at least one centering device, for example a centering pin.

In particular, the fan guard is connected to the at least one heat exchanger via at least one fourth mounting. In particular, the fourth mounting comprises a clip connection, a screw connection, a clamp connection, a rivet connection, an adhesive connection, or the like.

In particular, the fan guard and the at least one heat exchanger are aligned with one another via at least one centering device, for example a centering pin.

A motor vehicle having a drive unit (for example, an electric machine, an internal combustion engine, or the like) for driving the motor vehicle, and the described mounting arrangement are proposed. The mounting arrangement is situated in particular in a front area (with respect to the customary travel direction) of the motor vehicle (front end). The mounting arrangement is in particular installed in front of a drive unit of the motor vehicle, in the travel direction.

Due to the design of the protective element or the mounting arrangement, a fluid or cooling air utilization level may be increased by up to 12%, depending on the motor vehicle. In addition, recirculation of warm fluid or warm ambient air in front of the at least one heat exchanger may be at least improved by the fan operation when the motor vehicle is in standstill or idling mode.

The statements concerning the mounting arrangement may be applied in particular to the motor vehicle, and vice versa.

As a precaution, it is noted that the ordinal numbers used herein ("first," "second," "third," . . . ) are used primarily (only) to distinguish between multiple similar objects, variables, or processes; i.e., in particular no dependency and/or sequence of these objects, variables, or processes relative to one another are/is necessarily specified. If a dependency and/or sequence is necessary, this is explicitly indicated herein, or is readily apparent to those skilled in the study of the embodiment specifically described. If a component may be present in a plurality ("at least one"), the description for one of these components may similarly apply for all or a portion of the plurality of these components, although this is not absolutely necessary.

BRIEF DESCRIPTION OF THE DRAWINGS

The invention and the technical context are explained in greater detail below with reference to the appended figures. It is pointed out that the invention is not to be construed as being limited by the illustrated exemplary embodiments. In particular, unless explicitly stated otherwise, it is also possible to extract partial aspects of the information shown in the figures and combine them with other components and findings from the present description. In particular, it is noted that the figures and in particular the illustrated proportions are only schematic. In the figures.

DETAILED DESCRIPTION OF THE INVENTION

Figure 1:
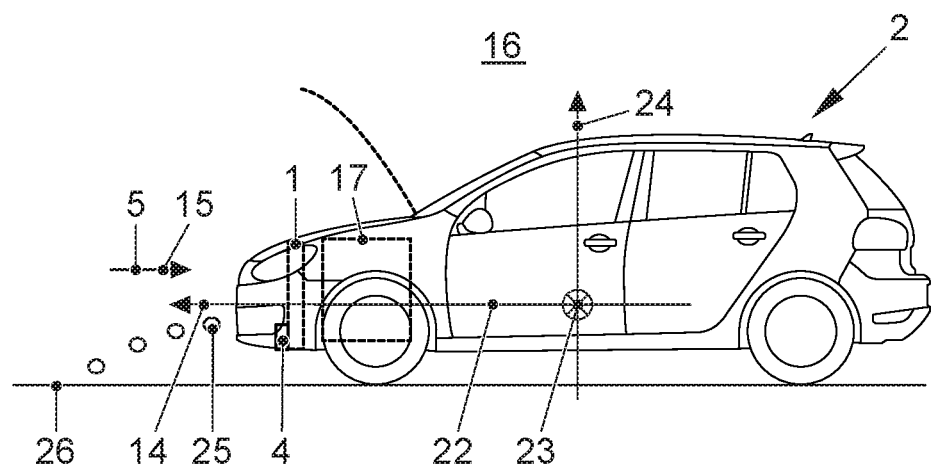
FIG. 1: shows a motor vehicle in a side view.

FIG. 1 shows a motor vehicle 2 in a side view. In the front end, the motor vehicle 2 has a mounting arrangement 1 and a drive unit 17 in succession. The motor vehicle 2 has a longitudinal axis 22, a transverse axis 23, and a yaw axis 24.

A fluid 5 flows through the motor vehicle 2 along the flow path 15 (when the motor vehicle 2 is moving in the travel direction), parallel to the longitudinal axis 14. The fluid 5 acts on and flows across or through the heat exchanger 3 of the mounting arrangement 1. A protective element 4 of the mounting arrangement 1 protects the heat exchanger 3 from damage from stones 25, which may be tossed up when the motor vehicle 2 is traveling along the roadway 26.

Figure 2:
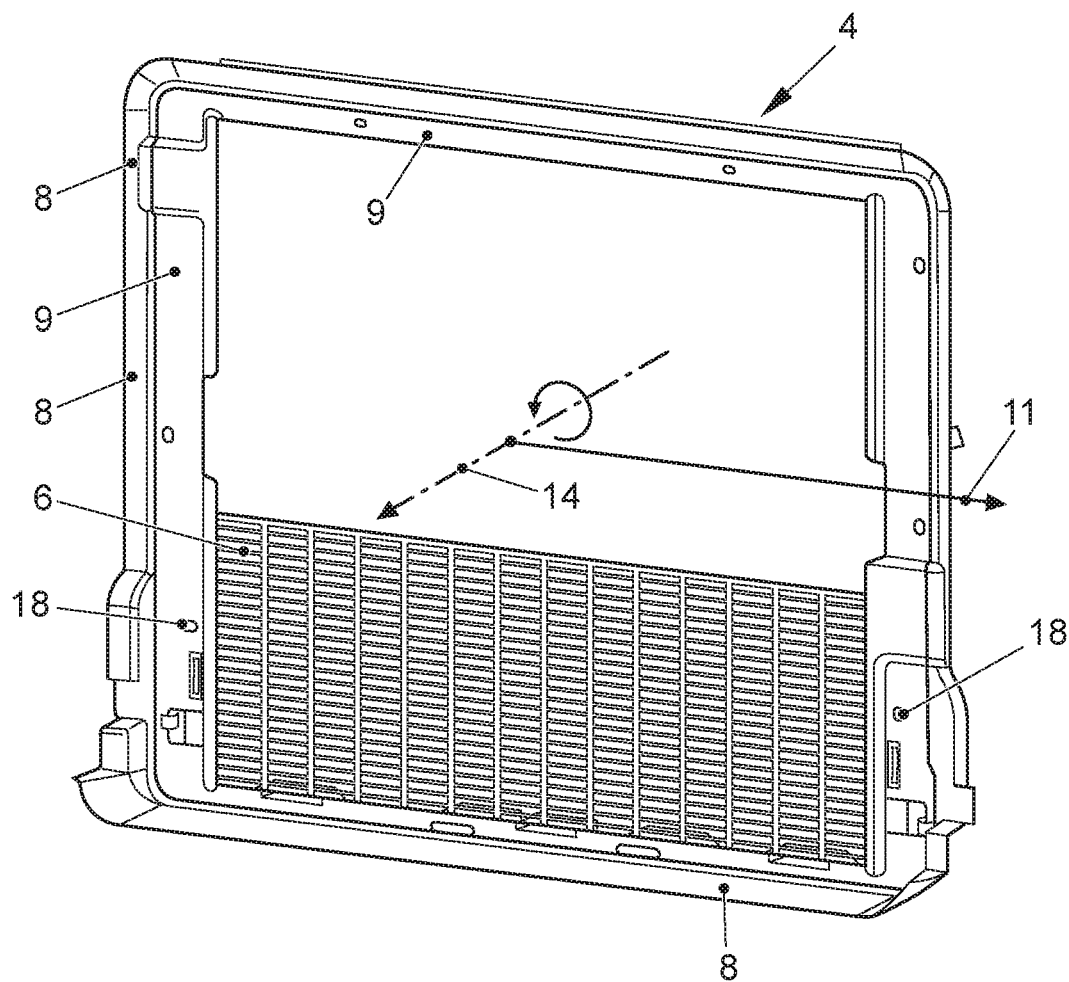
FIG. 2: shows a protective element in a perspective view.

FIG. 2 shows a protective element 4 in a perspective view. The protective element 4 has a grid structure 6 through which a fluid 5 may flow, and which at least partially covers a surface of the heat exchanger 3 across which the fluid 5 may flow. The protective element 4 is a component that is manufactured by an injection molding process, and has a sealing element 8, integrally formed onto the protective element 4 in a multicomponent method, for conducting flow of the fluid 5.

The grid structure 6 extends over a lower portion of the heat exchanger 3 opposite the force of gravity (extending along the yaw axis 24; see FIG. 1). The grid structure 6 extends over the entire width (transverse to the longitudinal axis 22) of the heat exchanger 3. The protective element 4 has a frame part 9 between the sealing element 8 and the grid structure 6. The grid structure 6 and the sealing element 8 are joined together in one piece via the frame part 9. The frame part 9 forms a frame having a design that is closed all the way around in a circumferential direction 10. The sealing element 8, starting from the frame part 9, extends outwardly at least in a radial direction 11.

Figure 3:
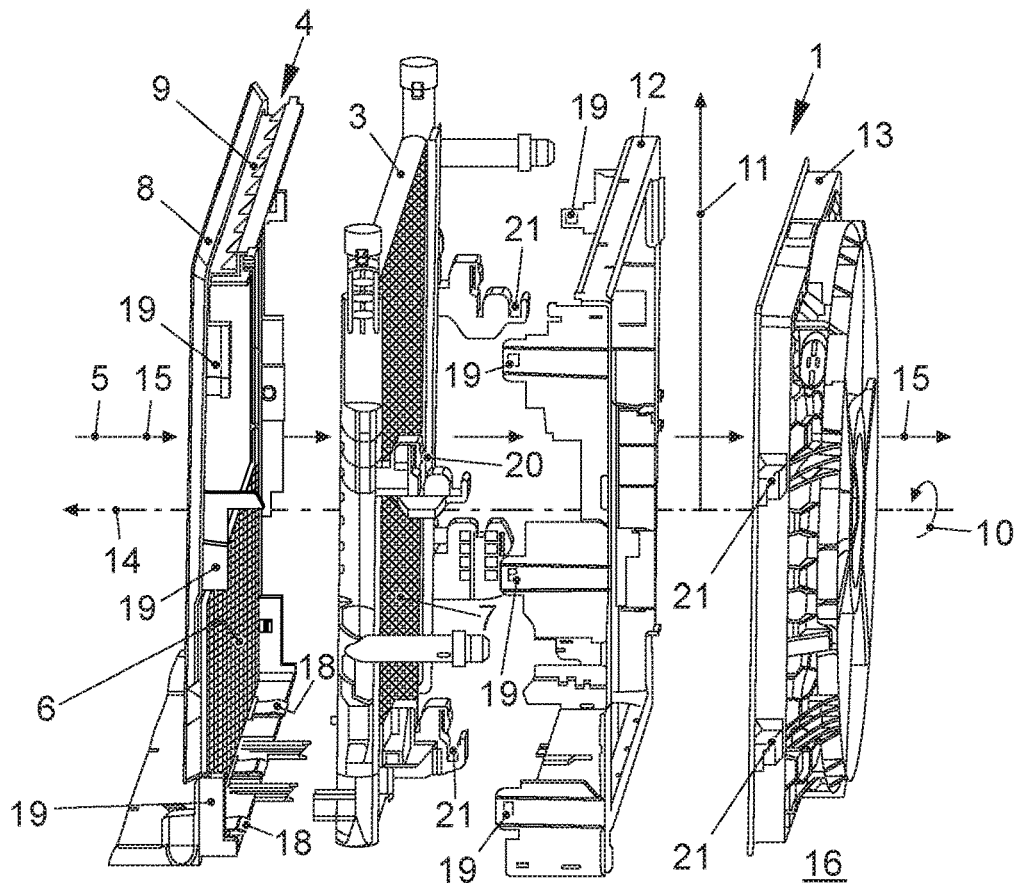
FIG. 3: shows a mounting arrangement in an exploded illustration in a perspective view.
Figure 4:
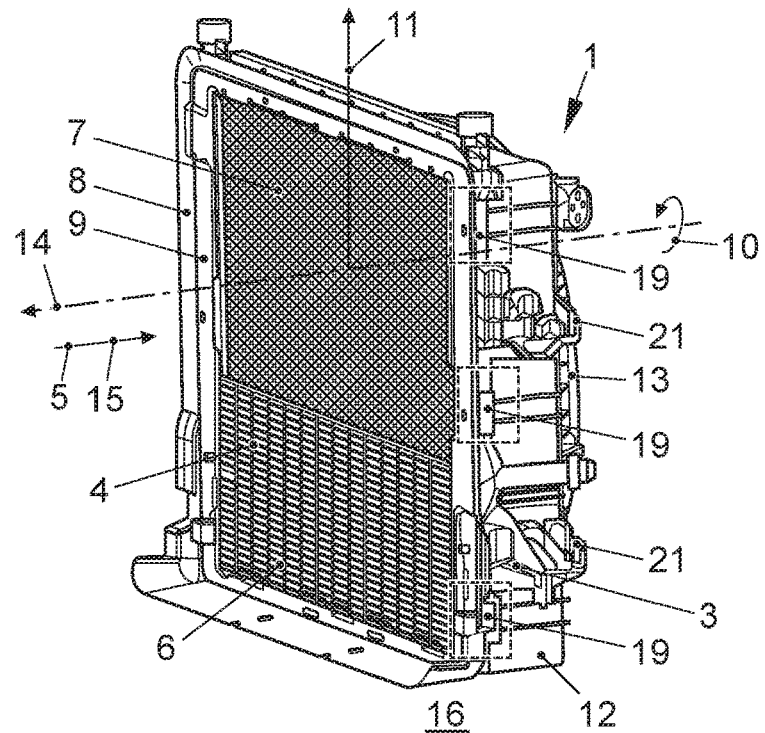
FIG. 4: shows the mounting arrangement according to FIG. 3 in a first perspective view.
Figure 5:
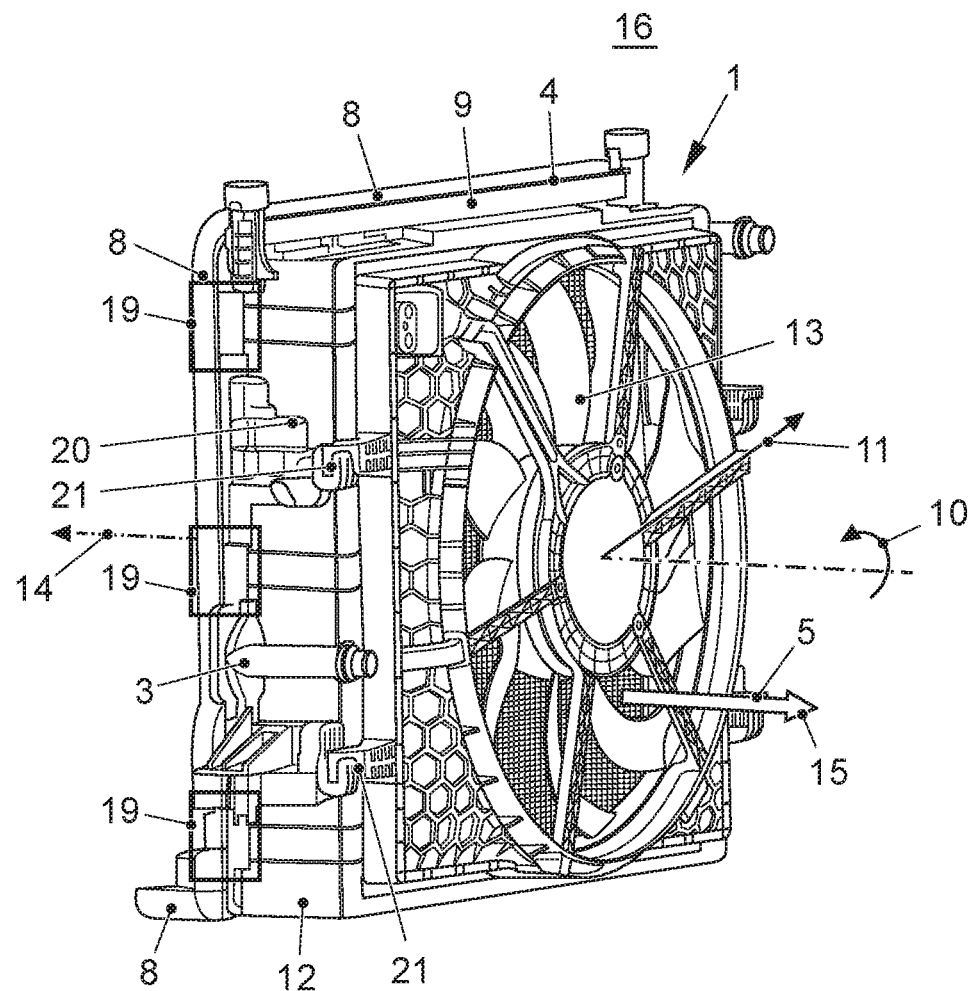
FIG. 5: shows the mounting arrangement according to FIGS. 3 and 4 in a second perspective view.
Figure 6:
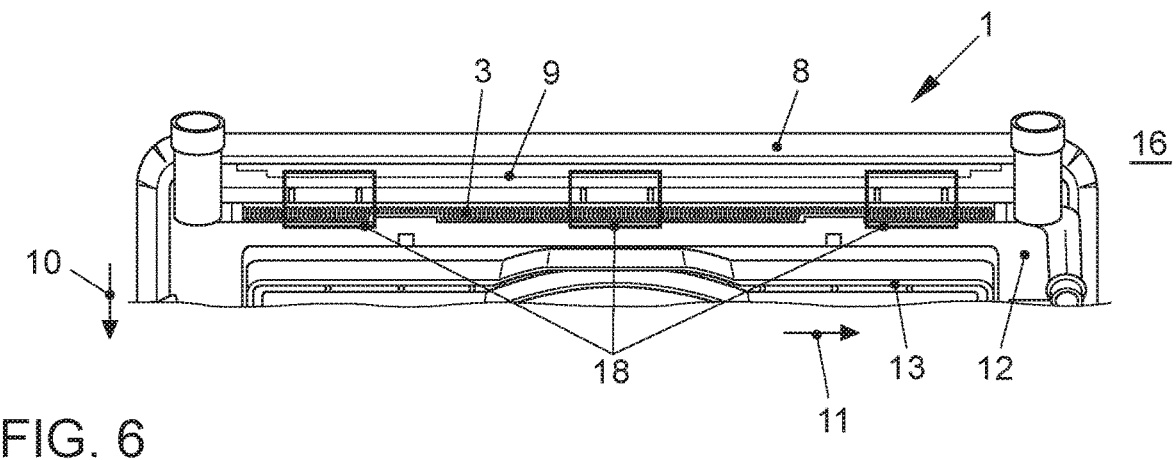
FIG. 6: shows a first detail of the mounting arrangement according to FIGS. 3 through 5 in a perspective view.
Figure 7:
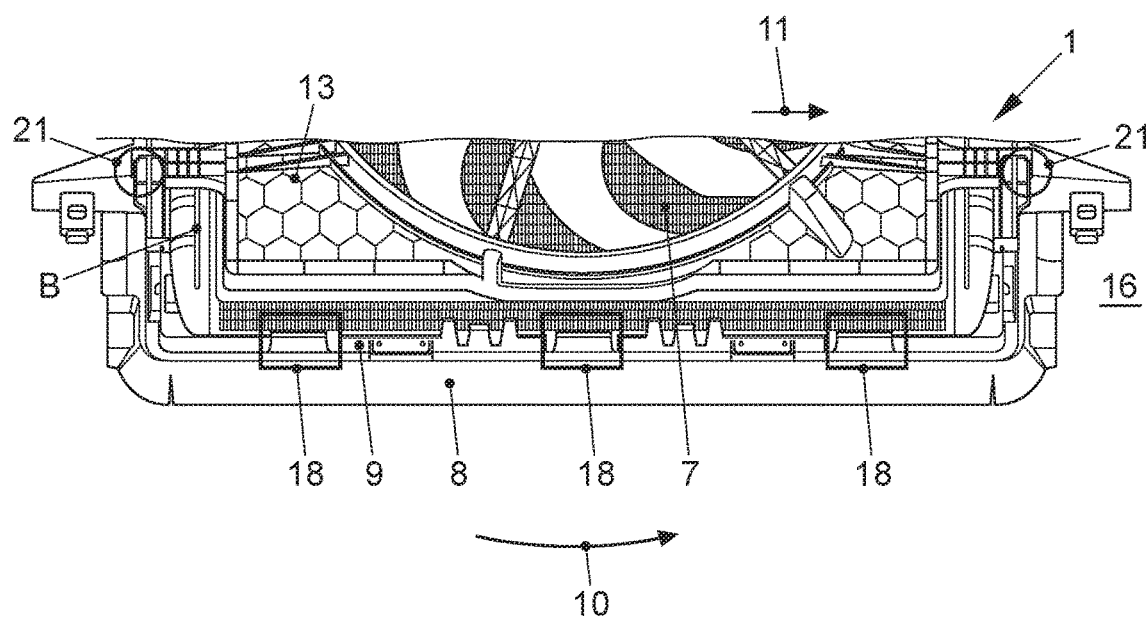
FIG. 7: shows a second detail of the mounting arrangement according to FIGS. 3 through 5 in a perspective view.

FIG. 3 shows a mounting arrangement 1 in an exploded illustration in a perspective view. FIG. 4 shows the mounting arrangement 1 according to FIG. 3 in a first perspective view. FIG. 5 shows the mounting arrangement 1 according to FIGS. 3 and 4 in a second perspective view. FIG. 6 shows a first detail of the mounting arrangement 1 according to FIGS. 3 through 5 in a perspective view. FIG. 7 shows a second detail of the mounting arrangement 1 according to FIGS. 3 through 5 in a perspective view. FIGS. 3 through 7 are described together in the following discussion, with reference to the statements for FIGS. 1 and 2.

Along the flow path 15 of a fluid 5, the mounting arrangement 1 has in succession a protective element 4, a heat exchanger 3, a seal carrier 12, and a fan guard 13, which are connected or connectable to one another to form an assembly or mounting unit.

The protective element 4 and the heat exchanger 3 are (directly) connected to one another via first mountings 18 situated on the frame part 9 (see FIGS. 3, 6, and 7).

The sealing element 8 extends at least partially along the frame part 9, closed all around, along the circumferential direction 10. The sealing element 8 has slots, so that a desired pattern may be ensured in corner areas of the protective element 4 without undesirable deformation of the sealing element 8 having a circumferentially closed design.

The seal carrier 12 seals off with respect to the surroundings 16 a flow path 15 for the fluid 5, extending along an axial direction 14, between the heat exchanger 3 and the fan guard 13.

The fan guard 13 is used here to accommodate a fan wheel, via which a fluid flow may be forced through the heat exchanger 3, in particular when the motor vehicle 3 is at a standstill.

The seal carrier 12 is connected to the protective element 4 via a plurality of second mountings 19 (see FIGS. 3, 4, and 5).

The seal carrier 12 is also connected to the heat exchanger 3 via a plurality of third mountings 20 (see FIGS. 3 and 5).

The fan guard 13 is connected to the heat exchanger 3 via a plurality of fourth mountings 21 (see FIGS. 3, 4, 5, and 7).

LIST OF REFERENCE NUMERALS 1 mounting arrangement
2 motor vehicle
3 heat exchanger
4 protective element
5 fluid
6 grid structure
7 surface
8 sealing element
9 frame part 10 circumferential direction
11 radial direction
12 seal carrier
13 fan guard
14 axial direction
15 flow path
16 surroundings
17 drive unit
18 first mounting
19 second mounting
20 third mounting
21 fourth mounting
22 longitudinal axis
23 transverse axis
24 yaw axis
25 stone
26 roadway

The invention claimed is:

1. A mounting arrangement for a motor vehicle, comprising:
    at least one heat exchanger, and
    a protective element for the at least one heat exchanger, having a grid structure through which a fluid may flow that at least partially covers a surface, over which the fluid may flow, of the at least one heat exchanger,
    wherein the protective element is a component that is manufactured by an injection molding process, and has at least one sealing element, integrally formed on the protective element in a multicomponent method, for conducting flow of the fluid, and
    wherein the protective element has a frame part that forms a frame around the at least one heat exchanger in a circumferential direction,
    wherein the frame part of the protective element is located between the at least one sealing element and the grid structure, and
    wherein the frame part has a design that is closed all around the protective element and the at least one heat exchanger in the circumferential direction.

2. The mounting arrangement according to claim 1, wherein the at least one sealing element of the protective element has at least
    a lower density,
    a smaller wall thickness, or
    greater elastic deformability than at least the grid structure of the protective element.

3. The mounting arrangement according to claim 1, wherein the protective element and the at least one heat exchanger are connected to one another at least via at least one first mounting situated on the frame part.

4. The mounting arrangement according to claim 1, wherein the frame part and the grid structure are made of the same material.

5. The mounting arrangement according to claim 1, wherein the at least one sealing element extends at least partially along the frame part, closed all around, along the circumferential direction.

6. A motor vehicle having a drive unit for driving the motor vehicle and a mounting arrangement according to claim 1.

7. A mounting arrangement for a motor vehicle, comprising:
    at least one heat exchanger, and
    a protective element for the at least one heat exchanger, having a grid structure through which a fluid may flow that at least partially covers a surface, over which the fluid may flow, of the at least one heat exchanger,
    wherein the protective element is a component that is manufactured by an injection molding process, and has at least one sealing element, integrally formed on the protective element in a multicomponent method, for conducting flow of the fluid, and
    wherein the protective element has a frame part that forms a frame around the at least one heat exchanger in a circumferential direction,
    wherein the frame part of the protective element is located between the at least one sealing element and the grid structure,
    wherein the protective element and the at least one heat exchanger are connected to one another at least via at least one first mounting situated on the frame part,
    wherein the mounting arrangement additionally has at least one seal carrier and a fan guard,
    wherein the seal carrier seals off with respect to the surroundings a flow path for the fluid, extending along an axial direction, between the at least one heat exchanger and the fan guard, and
    wherein the seal carrier is connected to the protective element via at least one second mounting.

8. The mounting arrangement according to claim 7, wherein the seal carrier is connected to the at least one heat exchanger via at least one third mounting.

9. The mounting arrangement according to claim 8, wherein the fan guard is connected to the at least one heat exchanger via at least one fourth mounting.

10. A mounting arrangement for a motor vehicle, comprising:
    at least one heat exchanger, and
    a protective element for the at least one heat exchanger, having a grid structure through which a fluid may flow that at least partially covers a surface, over which the fluid may flow, of the at least one heat exchanger,
    wherein the protective element is a component that is manufactured by an injection molding process, and has at least one sealing element, integrally formed on the protective element in a multicomponent method, for conducting flow of the fluid,
    wherein the protective element has a frame part that forms a frame around the at least one heat exchanger in a circumferential direction,
    wherein the frame part of the protective element is located between the at least one sealing element and the grid structure,
    wherein the frame part has a design that is closed all around the protective element and the at least one heat exchanger in the circumferential direction, and
    wherein the at least one sealing element, starting from the frame part, extends outwardly at least in a radial direction.

11. The mounting arrangement according to claim 10, wherein the at least one sealing element of the protective element has at least
    a lower density,
    a smaller wall thickness, or
    greater elastic deformability than at least the grid structure of the protective element.

12. The mounting arrangement according to claim 10, wherein the protective element and the at least one heat exchanger are connected to one another at least via at least one first mounting situated on the frame part.

13. The mounting arrangement according to claim 10, wherein the frame part and the grid structure are made of the same material.

14. The mounting arrangement according to claim 10, wherein the at least one sealing element extends at least partially along the frame part, closed all around, along the circumferential direction.

\* \* \* \* \*